M. S. MUNN.
SHOE SOLE TRIMMER.
APPLICATION FILED AUG. 8, 1912.
1,060,694.
Patented May 6, 1913.
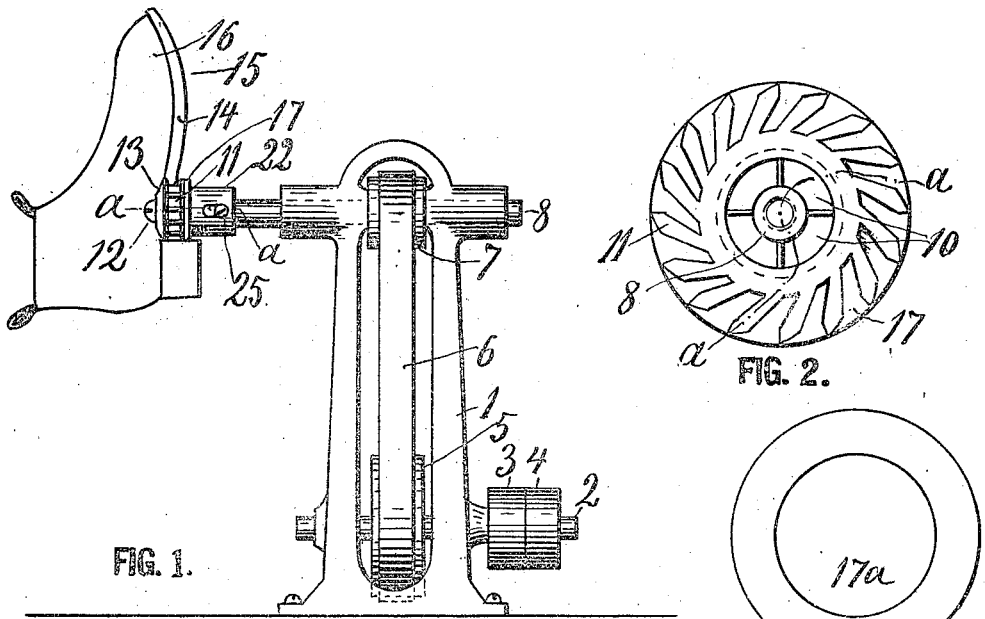
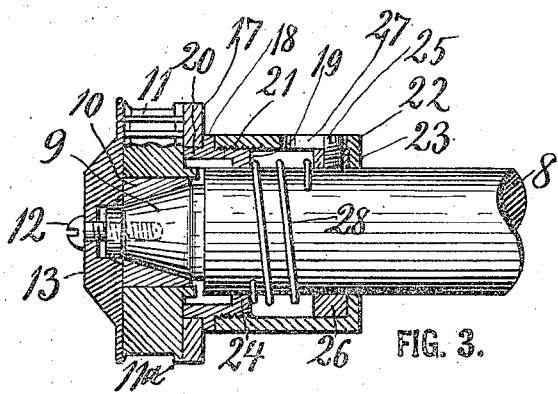
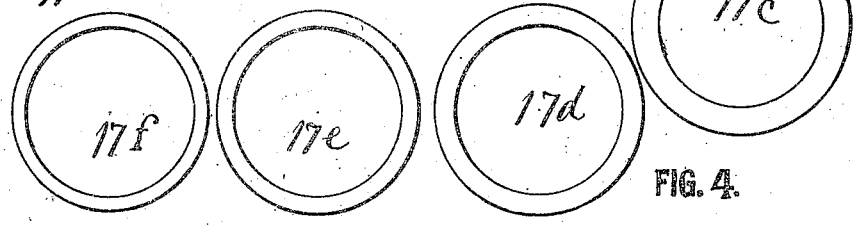
WITNESSES:
C. E. Carlsen
D. E. Carlsen
INVENTOR:
Merton S. Munn.
BY his ATTORNEY:
A. M. Carlsen.

UNITED STATES PATENT OFFICE.

MERTON S. MUNN, OF STILLWATER, MINNESOTA.

SHOE-SOLE TRIMMER.

1,060,694.  Specification of Letters Patent.  Patented May 6, 1913.

Application filed August 8, 1912. Serial No. 714,020.

*To all whom it may concern:*

Be it known that I, MERTON S. MUNN, a citizen of the United States, residing at Stillwater, in the county of Washington and State of Minnesota, have invented a new and useful Shoe-Sole Trimmer, of which the following is a specification.

My invention relates to improvements in machinery for trimming the edges of the soles of shoes and boots, and has especial reference to the part of such machines known as the cutter and the cutter head.

The object of the invention is to save material and labor in the making of the cutters. Another object is to save considerable time in the use of such trimming tools, and a further object is to enable the workman to do better work than with the cutters heretofore used.

In the accompanying drawing, Figure 1 is a side elevation of a sole trimming machine provided with my improved cutter and cutter head and a shoe in position to be operated on by the machine. Fig. 2 is an enlarged left hand end view of the shaft and cutter shown in Fig. 1 with the plate 13 and screw 12 removed. Fig. 3 is a side view of the shaft 8 in Figs. 1 and 2 and a diametrical section on the line $a$—$a$ of the cutter head and the cutter, except that the internal spring 28 and the top portion of the cutter are not in section. Fig. 4 is a series of rings of different outside diameters for purposes hereinafter described.

Referring to the drawing by reference numerals, 1 designates the frame, 2 the countershaft therein with tight pulley 3 and loose pulley 4. On said shaft is fixed a larger pulley 5 driving by a belt 6 a smaller pulley 7 which is fixed on the cutter shaft 8. The latter shaft is journaled in the upper end of the frame and has one end conic as shown at 9 in Fig. 3. Upon said cone is placed an internally cone shaped collar 10, which is divided radially into four equal sections, as best shown in Fig. 2. The cutter 11 has its central cylindrical hole placed upon said divided collar and is firmly secured on the shaft by a screw 12, which is threaded into the end of the shaft, and a shield 13 which presses against the outer end of the collar. Said shield also serves to shield the upper of the shoe from contact with the cutter when the latter is in rotating operation on the edge 14 of the sole 15 of the shoe 16.

Against the rear side of the cutter is fitted a washer or ring 17, which is rotatably retained between the cutter and the external flange 18 of a collar 19, upon whose short front end 20 the ring is journaled. The rear end of said collar 19 is detachably threaded at 21 into a drum 22, whose front portion it forms. The ends of the drum are guided on the shaft by an internal flange 23 and a similar flange 24 of the collar 19. In the rear end of the drum is movably secured on the shaft by a set screw 25 a collar 26; 27 is a slot in the drum for said screw 25 to move in when the collar is changed forward so as to give more tension to a spring 28 which is partly compressed between the collars 19 and 26. The function of the spring is to hold the parts 17 and 20 close to the cutter without having to move the collar 26 and secure it or the drum in a new place for each variation of thickness of cutters used.

It will be seen that the diameter of the ring 17 is the same as that of the adjacent part 11$^a$ of the cutter, so that the latter can not mar the heel of the shoe although by said construction of the cutter and ring the operator is able to start the trimming of the sole close by the heel at one side and continue close to the heel at the other side of the shoe, while in the cutters heretofore used the rim 11$^a$ is much larger than the rest of the cutter and hence a second cutter and a second operation is required for trimming the sole near the heel by a so-called shank cutter. Such second tool and operation involve time and expenses which are obviated by my device. Another advantage is that while in earlier cutters the ring 17 is made integral with the drum 22 or at least with the collar 18, so that when the cutter is reduced in diameter by wear and grinding the collar or ring 17 must be ground or turned smaller from time to time until it is destroyed or it will hold the reduced cutter farther and farther away from the heel, I simply exchange the ring 17 for the next smaller size 17$^a$, then 17$^b$ &c of the series of rings shown in Fig. 4 and which are furnished with each machine and can be used over and over again in wearing out many cutters. I thus save the material and labor required to destroy and reproduce and refit the ring 17 and more or less of the drum carrying it. Taking it altogether, including also the repeated sharpening of two cutters instead of one and the cost of the extra machinery running the second cutter, it is evident that there is a considerable saving of labor, material and machinery by the use of my improvements. There is also more and better work done. It should be noted that the portion 11ª of the cutter has a sufficiently wide face to make no sharp crease in the leather but will trim the lower edge of the soles even if they vary some in thickness; hence only for greater variations of thickness need the cutter be exchanged for a thicker one, having a wider face.

What I claim is:—

1. In a machine of the class described, the combination of a rotary shaft, a cutter removably secured on one end thereof, a removable ring bearing against the rear side of the cutter, a drum slidable on the shaft near the cutter and having its front end reduced so as to fit in the said ring and hold it in concentric position to the cutter, a spring acting on the drum to hold it against the ring, and means preventing rotation of the drum on the shaft.

2. In a machine of the class described, the combination of a rotary shaft, a cutter removably secured on one end thereof, a removable ring bearing against the rear side of the cutter, a drum slidable on the shaft near the cutter and having its front end reduced so as to fit in the said ring and hold it in concentric position to the cutter, said drum having in one side a longitudinal slotted aperture, a collar adjustable on the shaft within the drum by a set-screw having its outer end portion guided in the slotted aperture, a helical partly compressed spring encircling the shaft between the collar and the front portion of the drum so as to press the latter against the cutter.

3. In a machine of the class described, the combination with a rotary shaft having a cone-shaped end with a threaded hole in the center thereof, of an internally conic split bushing fitted upon the cone, a rotary cutter having a central cylindrical hole fitting upon the split bushing, a washer on the end of the shaft in concentric position to the cutter and bearing against the outer end of the split bushing, a screw passed through a central hole in the washer and into the threaded hole of the shaft, said washer serving to wedge the bushing tightly into place and serving also as a shield at the forward side of the teeth of the cutter.

In testimony whereof I affix my signature, in presence of two witnesses.

MERTON S. MUNN.

Witnesses:
H. F. BOOREN,
R. B. McPHETRES